US012332890B1

(12) United States Patent
Mayr et al.

(10) Patent No.: US 12,332,890 B1
(45) Date of Patent: Jun. 17, 2025

(54) SHARED SUBPLAN PIPELINING INFERENCE

(71) Applicant: SAP SE, Walldorf (DE)

(72) Inventors: Manuel Mayr, Walldorf (DE); Paul Willems, Heidelberg (DE); Till Merker, Sandhausen (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/734,484

(22) Filed: Jun. 5, 2024

(51) Int. Cl.
*G06F 16/00* (2019.01)
*G06F 16/2453* (2019.01)

(52) U.S. Cl.
CPC .... *G06F 16/24542* (2019.01); *G06F 16/2454* (2019.01); *G06F 16/24549* (2019.01)

(58) Field of Classification Search
CPC ........... G06F 16/24542; G06F 16/2454; G06F 16/24549
See application file for complete search history.

(56) References Cited

U.S. PATENT DOCUMENTS

| | | | |
|---|---|---|---|
| 11,989,592 B1 * | 5/2024 | Kulkarni | H04L 63/0853 |
| 12,164,522 B1 * | 12/2024 | Ma | G06F 16/2365 |
| 2005/0222975 A1 * | 10/2005 | Nayak | G06F 16/338 |
| 2009/0307671 A1 * | 12/2009 | White | A63F 13/45 |
| | | | 717/149 |
| 2022/0114155 A1 * | 4/2022 | Dhuse | G06F 16/2379 |
| 2022/0382751 A1 * | 12/2022 | Dhuse | G06F 16/2282 |
| 2023/0091018 A1 * | 3/2023 | Arnold | G06F 16/24553 |
| | | | 707/765 |
| 2023/0107652 A1 * | 4/2023 | Veselova | G06F 16/24542 |
| 2023/0376485 A1 * | 11/2023 | Qu | G06F 16/24535 |
| 2024/0111745 A1 * | 4/2024 | Wendel, III | G06F 16/24561 |
| 2024/0134858 A1 * | 4/2024 | Schieferstein | G06F 16/24549 |
| 2024/0256541 A1 * | 8/2024 | Gladwin | G06F 16/24537 |
| 2025/0028707 A1 * | 1/2025 | Kondiles | G06F 16/27 |

OTHER PUBLICATIONS

Lindner, Daniel, Daniel Ritter, and Felix Naumann. "Enabling Data Dependency-based Query Optimization." arXiv preprint arXiv: 2406.06886 (2024).*
Han, Wook-Shin, and Jinsoo Lee. "Dependency-aware reordering for parallelizing query optimization in multi-core CPUs." Proceedings of the 2009 ACM SIGMOD International Conference on Management of data. 2009.*

* cited by examiner

*Primary Examiner* — Nan Hutton
(74) *Attorney, Agent, or Firm* — Mintz Levin Cohn Ferris Glovsky and Popeo, P.C.

(57) ABSTRACT

A database management system (DBMS) traverses an operator topology of a query plan to identify pipelines within the query plan. The query plan may include at least a first shared subplan reference, where the first shared subplan reference refers to a first shared subplan, and where the first shared subplan is associated with a shared node in the operator topology. Also, the DBMS assigns, based on an order of execution, pipeline indices to the pipelines in the query plan. Additionally, the DBMS tracks pipeline dependencies of the query plan. For each shared subplan reference, the database management system specifies the shared subplan reference as a pipeline breaker if its pipeline has a dependency to a pipeline with an index greater than a corresponding shared subplan. Otherwise, the shared subplan reference is specified as a non-pipeline breaker. Then, the query plan is updated based on these shared subplan reference specifications.

20 Claims, 14 Drawing Sheets

SHARED SUBPLAN PIPELINING INFERENCE

TECHNICAL FIELD

The present disclosure generally relates to efficiently supporting pipelining among subplans shared among different strands of evaluation.

BACKGROUND

Database management systems have become an integral part of many computer systems. For example, some systems handle hundreds if not thousands of transactions per second. On the other hand, some systems perform very complex multidimensional analysis on data. In both cases, the underlying database may need to handle responses to queries very quickly in order to satisfy systems requirements with respect to transaction time. A database query is a mechanism for retrieving data from one or more database tables. Queries may be generated in accordance with a corresponding query language. For example, structured query language (SQL) is a declarative querying language that is used to retrieve data from a relational database. Given the complexity of queries and/or the volume of queries, the underlying databases face challenges when attempting to optimize performance.

SUMMARY

In some implementations, a database management system traverses an operator topology of a query plan to identify pipelines within the query plan. The query plan may include at least a first shared subplan reference, where the first shared subplan reference refers to a first shared subplan, and where the first shared subplan is associated with a shared node in the operator topology. The database management system assigns a pipeline index to each pipeline in the query plan, where the pipeline index uniquely identifies each pipeline in the query plan according to a location and an order of execution of the pipeline within the query plan, and where a first pipeline of the first shared subplan reference is assigned a first pipeline index. The database management system tracks pipeline dependencies of the query plan, with pipeline dependencies being recorded using pipeline indices.

The database management system specifies the first shared subplan reference as a pipeline breaker responsive to determining that the first pipeline has a dependency to a second pipeline with a second pipeline index, and responsive to determining that the second pipeline index is greater than a third pipeline index associated with a third pipeline of the first shared subplan. Otherwise, the database management system specifies the first shared subplan reference as a non-pipeline breaker responsive to determining that the first pipeline does not depend on any pipeline having a pipeline index greater than the third pipeline index. The database management system updates the query plan with the first shared subplan reference being specified as either a pipeline breaker or a non-pipeline breaker. Then, the database management system generates, based on the updated query plan, an execution plan for execution of a corresponding query at run time.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

DETAILED DESCRIPTION

Many database systems share common subplans among different strands of evaluation. This technique prevents evaluating equivalent portions of a query plan more than once. This mechanism may be embodied by a relational operator named SharedSubPlan (SSP). Each SharedSubPlan is linked to one more SharedSubPlan References (SSPRefs), with each reference corresponding to a distinct strand of evaluation. Sharing subplans avoids the need for having to evaluate equivalent portions of a query plan more than once. As used herein, the term "query plan" may be defined as a sequence of operations for accessing a database. A "query plan" may be structured as a tree with relational algebra operators as nodes.

SSPRefs either support pipelining or can be declared as pipeline breakers. When a chunk of data arrives at the SharedSubPlan, the chunk is immediately pushed towards the next operators along the references that support pipelining. For the pipeline-breaking references, however, data chunks must be buffered. Each pipeline-breaking SPPRef marks the beginning of a new pipeline, which reads the data chunks from the buffer and pushes them to the next operators. A pipeline breaker incurs a performance penalty, so it is advantageous to minimize their usage whenever possible.

The naïve way of generating a query plan with shared subplan references is to put a pipeline breaker everywhere there is a shared subplan reference. However, this has performance implications. Only placing pipeline breakers where they are needed results in a performance improvement. Thus, subplan pipeline inference techniques are performance enhancement features.

Figure 1:
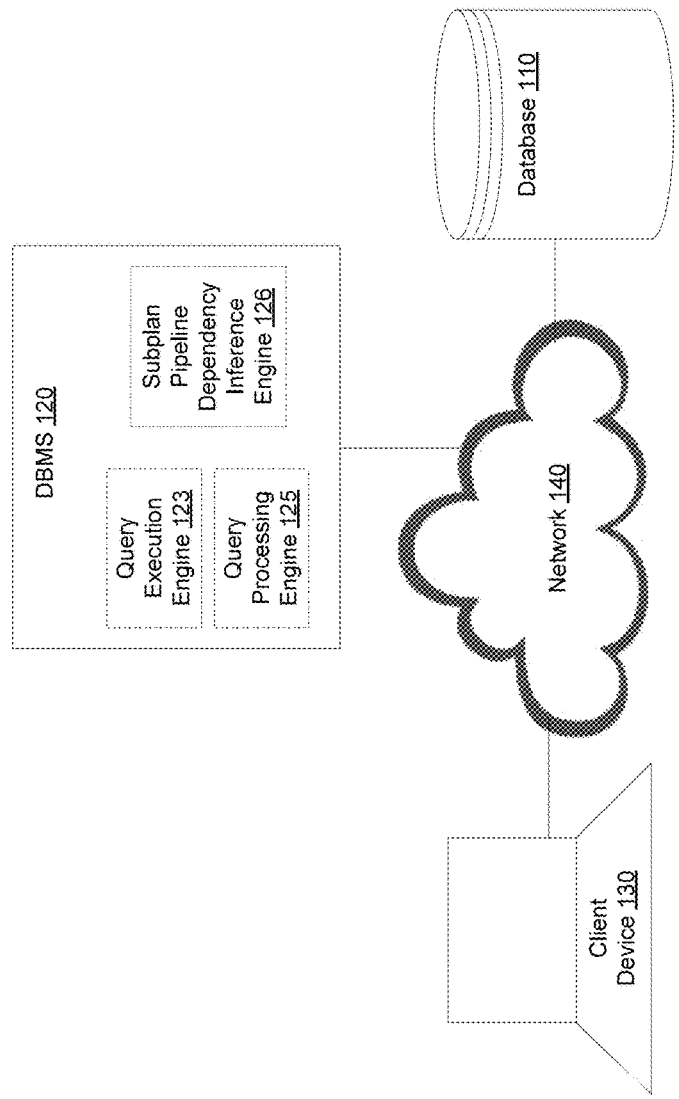
FIG. 1 illustrates a diagram of an example of a computing system, in accordance with some example implementations of the current subject matter.

FIG. 1 depicts an example of a computing system 100, in accordance with some example embodiments. Referring to FIG. 1, the computing system 100 may include a database 110, a database management system (DBMS) 120, and a client device 130. In an example, database management system 120 includes query execution engine 123, query processing engine 125, and subplan pipeline dependency inference engine 126. In other examples, database management system 120 may include other types of components. It is noted that database management system 120 may also be referred to as a database execution engine. It is also noted that while only a single database 110, a single database management system 120, and a single client device 130 are shown in FIG. 1, this is merely to avoid cluttering the figure. It should be appreciated that database 110 is representative of any number of databases, database management system 120 is representative of any number of database management systems, and client device 130 is representative of any number of client devices that may be included as part of computing system 100.

From an application or client perspective, it can be extremely cumbersome to access databases such as database 110. For example, an application may need to query different types of databases using complex queries. As a consequence, the application layer would need to be configured to handle the various types of databases and the various query types. Additionally or alternatively, each database 110 may need to process queries from the application into a format and structure that can be handled by the given database. Pushing complex operations and support for a variety of different database types to the application layer may contravene the need to have relatively lighter weight and/or readily deployable applications. On the other hand, pushing complex operations to the database layer where data is stored may draw processing and/or memory resources at the database 110 and may thus reduce the performance and response times for queries on that database layer.

In some example implementations, query execution engine 123 and/or query processing engine 125 may decouple the higher-level, application layer from the database layer (e.g., the persistence or storage layer where data including database tables may be stored and/or queried using instructions, such as commands and/or the like). The query execution engine 123 and/or query processing engine 125 may be implemented separately from the database layer and/or the application layer. Further, the query execution engine 123 and/or query processing engine 125 may be configured to receive a query, generate a query plan (including for example query algebra), optimize the query plan, and/or generate executable code, which can be executed at runtime. The executable code may include pre-compiled code (which can be selected for certain operations in the query plan) and/or code that is generated just-in-time specifically for execution of the query plan.

After query execution engine 123 and/or query processing engine 125 generate a query plan, subplan pipeline dependency inference engine 126 may be configured to determine whether to insert pipeline breakers or non-pipeline breakers in the query plan at the locations of the shared subplan references. In an example, the query plan may be structured as a directed acyclic graph. In some embodiments, subplan pipeline dependency inference engine 126 may traverse an operator topology of the query plan to identify pipelines within the query plan. As used herein, the term "pipeline" may be defined as a separate execution path within the query plan, where each separate execution path includes one or more operators to be executed in sequence. As used herein, the term "operator" may be defined as an object of a class, where the object has a run method which implements the run-time semantics of the operator. The body of the run method is a sequence of execution steps.

It is noted that the terms "pipeline" and "execution pipeline" may be used interchangeably herein. A pipeline takes a base table or result set of a previously-executed pipeline as input and performs a mix of unary operators or probes (e.g., hash joins) into the base table or result set in order to build another result set. Accordingly, pipelines are interdependent in that execution of a given pipeline may require the prior execution of one or more other pipelines.

Subplan pipeline dependency inference engine 126 may track pipeline dependencies during traversal of the operator topology of the query plan. Still further, subplan pipeline dependency inference engine 126 may assign a pipeline index to each pipeline based on a location of the pipeline in the query plan and based on an order of execution within the query plan. For each shared subplan reference in the query plan, subplan pipeline dependency inference engine 126 may specify the shared subplan reference as a pipeline breaker if a first given pipeline on which the shared subplan reference depends has a first index greater than a second index associated with a second given pipeline from which the shared subplan reference originates. It is noted that the second given pipeline from which the shared subplan reference originates is the pipeline that is associated with the shared subplan relation itself. Otherwise, subplan pipeline dependency inference engine 126 may specify the shared subplan reference as a non-pipeline breaker if the shared subplan reference does not depend on any pipeline having an index greater than the second index associated with the second given pipeline from which the shared subplan reference originates. It is noted that subplan pipeline dependency inference engine 126 may perform the above steps on the query plan or on a fragment (i.e., a portion) of the query plan. After determining the pipeline breaker or non-pipeline breaker status of each shared subplan references in the query plan, the query execution engine 123 and/or query processing engine 125 may generate, based on an updated version of the query plan, an execution plan for use in execution of a corresponding query at run time.

The database 110, the database management system 120, and the client device 130 may be communicatively coupled via a network 140. In some example embodiments, the database 110 may be a relational database. However, it should be appreciated that the database 110 may be any type of database including, for example, an in-memory database, a hierarchical database, an object database, an object-relational database, and/or the like. For example, instead of and/or in addition to being a relational database, the database 110 may be a graph database, a column store, a key-value store, a document store, and/or the like.

The database management system 120 may be configured to respond to requests from one or more client devices including, for example, the client device 130. For example, as shown in FIG. 1, the client device 130 may communicate with the database management system 120 via the network 140, which may be any wired and/or wireless network including, for example, a public land mobile network (PLMN), a wide area network (WAN), a local area network (LAN), a virtual local area network (VLAN), the Internet, and/or the like. The client device 130 may be a processor-based device including, for example, a desktop computer, a laptop, a smartphone, a tablet computer, a wearable apparatus, a virtual assistant, an Internet-of-Things (IoT) appliance, and/or the like.

Figure 2:
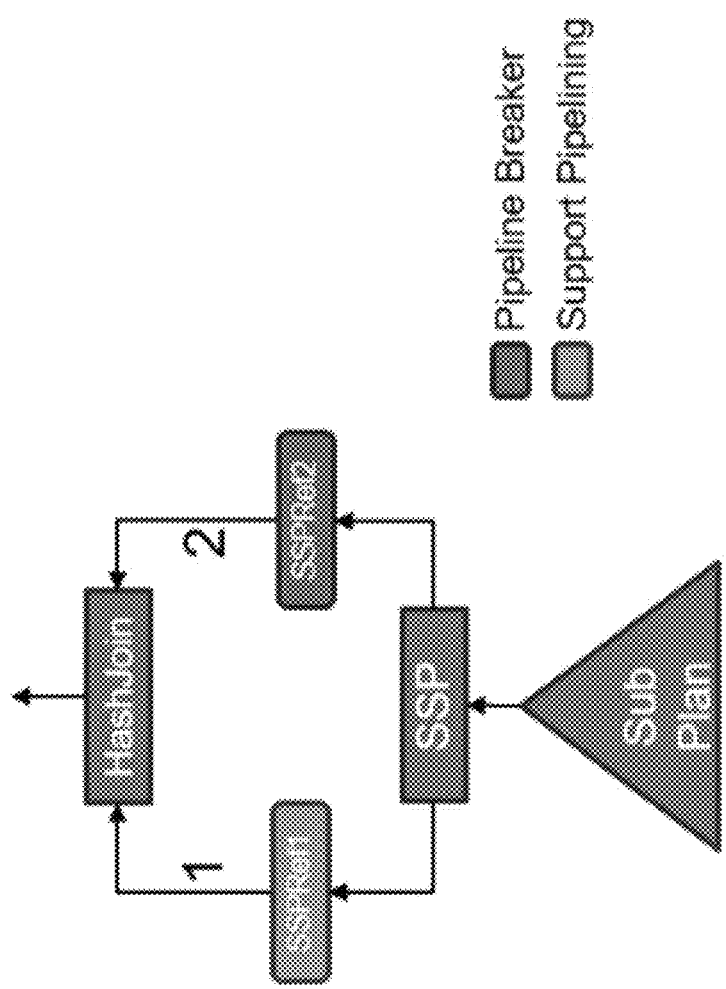
FIG. 2 illustrates a diagram of a self-join plan fragment, in accordance with some example implementations of the current subject matter.

Turning now to FIG. 2, a diagram of a self-join plan fragment is depicted, in accordance with one or more embodiments of the current subject matter. In the diagram shown in FIG. 2, the build side of the HashJoin is on the left side of the plan fragment, while the probe side is located on the right side of the plan fragment. The build side of a HashJoin introduces a pipeline breaker, because the build side builds a HashMap for the probe side to lookup. This means that the probe side has a dependency to a HashMap that is built by the join operators on the build side. This dependency may be referred to as a pipeline dependency.

As shown in FIG. 2, there are two links which are referred to as shared subplan references, and these shared subplan references decide how this subplan is executed internally. The shared subplan references in FIG. 2 are referred to as SSPRef1 and SSPRef2. A subplan pipeline dependency inference engine (e.g., subplan pipeline dependency inference engine 126 of FIG. 1) may determine whether to qualify the shared subplan references as breaking references, with a breaking reference also referred to as a pipeline breaker. If a shared subplan reference is defined as a pipeline breaker, this means that the reference needs to materialize an intermediate result before sending the result to the next operator. Alternatively, a shared subplan reference may be qualified as a pipeliner (i.e., supporting pipelining) so that when a data chunk arrives at the shared subplan (SSP) the chunk is immediately pushed to the next operator.

If it is assumed that both shared subplan references SSPRef1 and SSPRef2 support pipelining, then each chunk that arrives at the shared subplan would immediately be pushed to the next operators along SSPRef1 and then to SSPRef2. Since there is no other pipeline breaker from SSPRef2 along the path to the probe side of the HashJoin, this would result in a crash and wrong results when performing the lookup, because the HashMap has not been built yet. To avoid this outcome, SSPRef2 should be marked as a pipeline breaker. On the other hand, SSPRef1 does not need to be marked as a pipeline breaker, because there is no dependency to states built in a previous pipeline.

Figure 3:
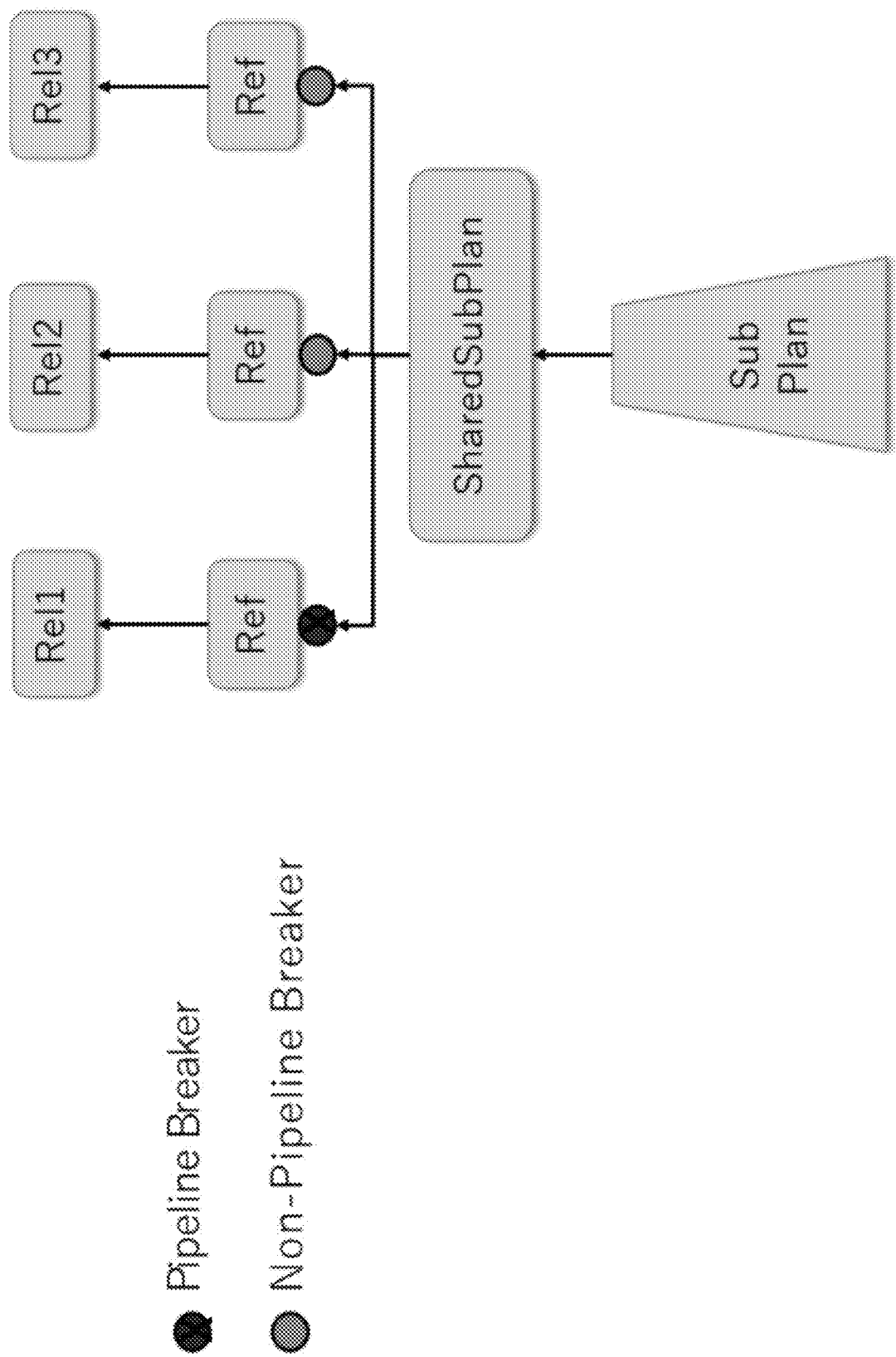
FIG. 3 illustrates a diagram of an example topology of a plan fragment, in accordance with some example implementations of the current subject matter.

Referring now to FIG. 3, a diagram of an example topology of a plan fragment is depicted, in accordance with one or more embodiments of the current subject matter. A shared subplan may be referenced any number of times in a query plan, with the example plan depicted in FIG. 3 having a shared subplan which is referenced three times by three separate pipelines. Some references may be qualified as pipeline breakers, and other references may be qualified as non-pipeline breakers (i.e., pipeliners). The pipeline on the left is identified as a pipeline breaker while the other two pipelines in the center and on the right are identified as non-pipeline breakers. A pipeline breaker stops execution and accumulates a result before proceeding.

Figure 4:
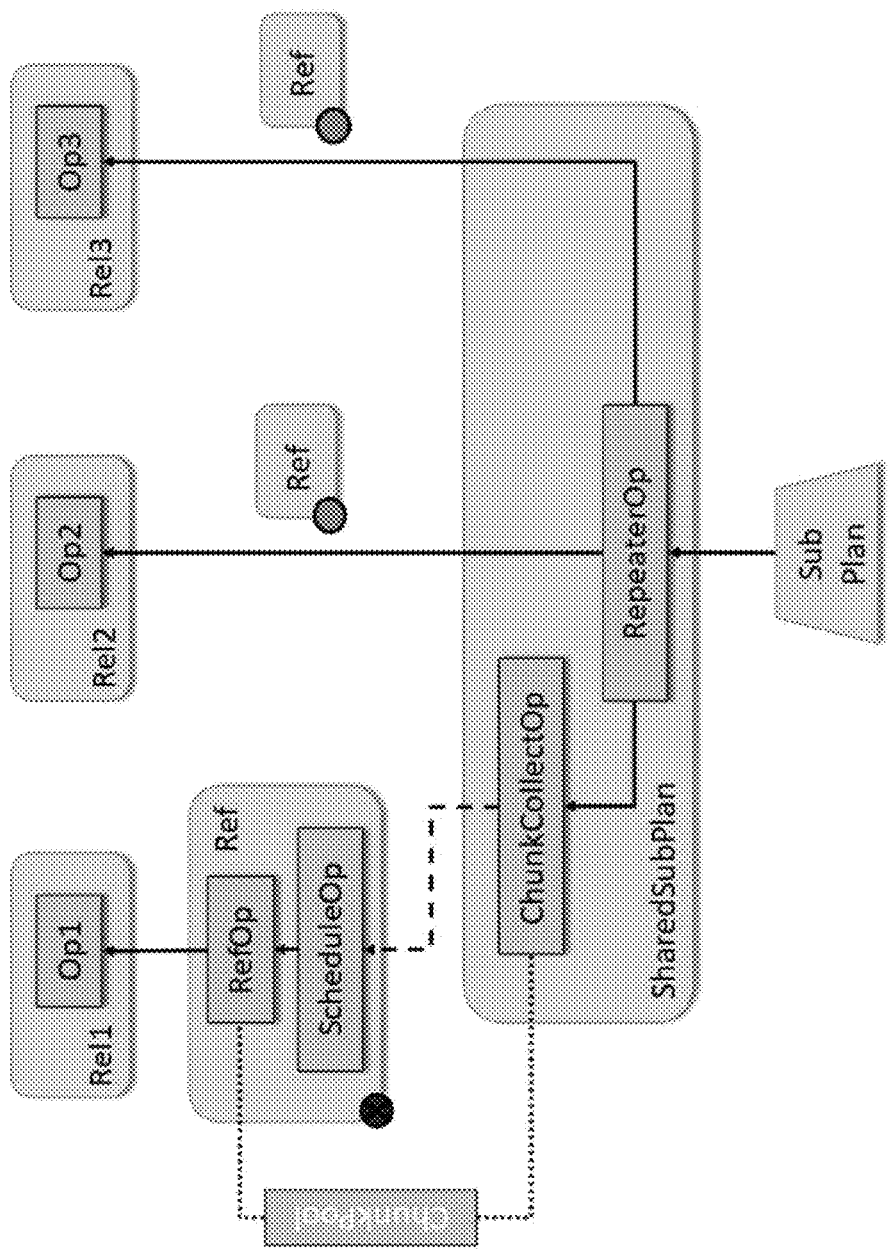
FIG. 4 illustrates a diagram of an example topology of a plan fragment, in accordance with some example implementations of the current subject matter.

Turning now to FIG. 4, a diagram of an example topology of a plan fragment is depicted, in accordance with one or more embodiments of the current subject matter. When a reference is qualified as a pipeline breaker, this has performance implications. With respect to memory consumption, data is accumulated and copied, and the entire intermediate result is held in a data pool.

When a shared subplan reference is qualified as a pipeline breaker, separate operators are introduced. These operators that are introduced include the chunk collect operator which collects the chunks and saves the collected chunks. As used herein, the term "chunk" may be defined as an amount of data to be processed. In an example, a "chunk" refers to one or more rows to be processed. After the collected chunks have been saved, processing of the chunks may be scheduled in order to retrieve the chunks from the pool and send the chunks to the next operator. If a reference is qualified as a non-pipeline breaker, operations may be pipelined. In this case, as soon as a chunk arrives from the subplan, the chunk may be passed immediately to the next operator with no intermediate step.

Figure 5:
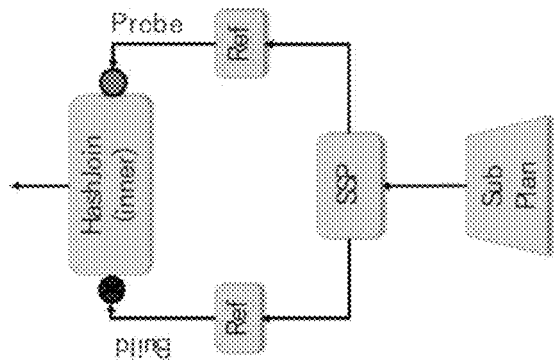
FIG. 5 illustrates a diagram of a binary HashJoin and code for determining which children are pipeline breakers, in accordance with some example implementations of the current subject matter.

Turning now to FIG. 5, a diagram of a binary HashJoin and code for determining which children are pipeline breakers are depicted, in accordance with one or more embodiments of the current subject matter. As shown on the right-side of FIG. 5, a binary HashJoin is depicted. For each relational operator, a determination is made to find out which of the relational operator's children are pipeline breakers. In an example, the code on the left-side of FIG. 5 may be used to determine which children are pipeline breakers. The HashJoin breaks at the build side at the first child, where the chunks are accumulated. On the probe side, it does not break, but passes the pipeline through. The pipeline from the probe side will also remain active after the HashJoin. So a new pipeline will not be created, but the existing pipeline will continue. In an example, this step will be performed for every operator which is introduced into the plan in order to enable the shared subplan pipelining inference mechanism. Once it is determined which of the relational operator children are pipeline breakers, the pipeline dependencies can be determined. In this example, the probe side depends on the build side, which is determined based on the break at the first child.

Figure 6:
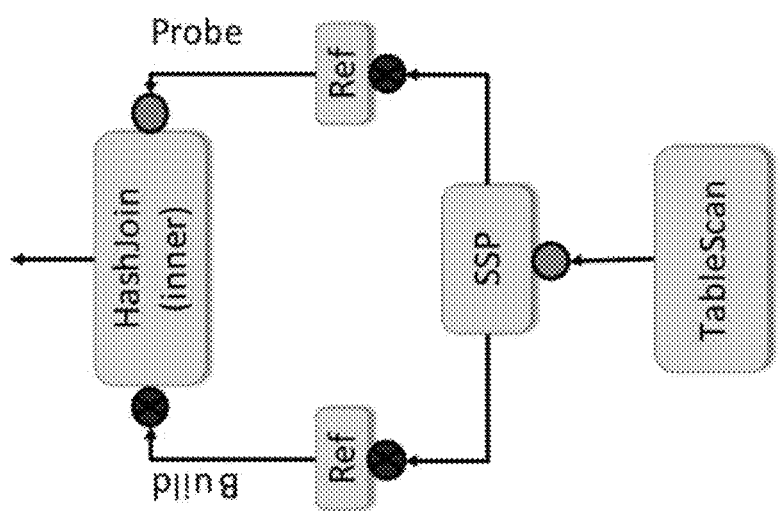
FIG. 6 illustrates a diagram of a plan fragment, in accordance with some example implementations of the current subject matter.

Turning now to FIG. 6, a diagram of a plan fragment is depicted, in accordance with one or more embodiments of the current subject matter. During the first traversal of a plan fragment, all shared subplan references may be marked as pipeline breakers as a prerequisite for a subsequent inference algorithm. By marking each shared subplan reference as a pipeline breaker, each shared subplan reference will start a separate pipeline. Marking each shared subplan reference as a pipeline breaker is a temporary assignment, and this assignment may change upon a second traversal of the plan fragment, as will be described in further detail below.

Figure 7:
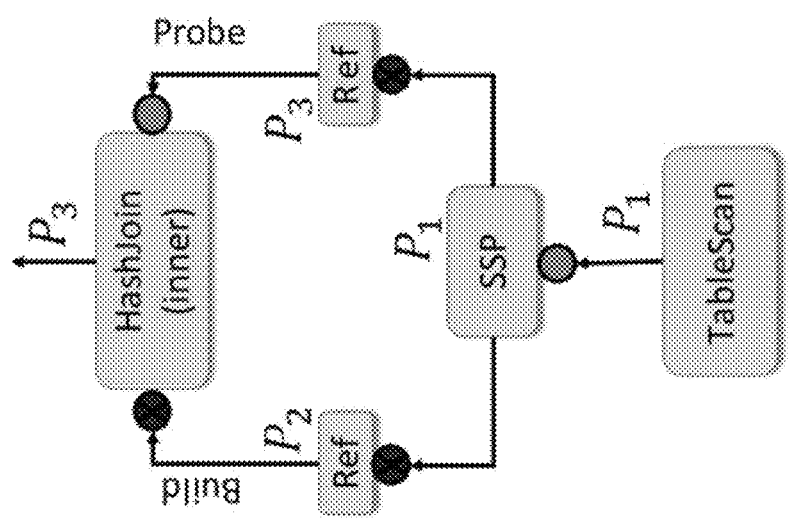
FIG. 7 illustrates a diagram of a plan fragment after the first traversal and after a post-order rank has been introduced, in accordance with some example implementations of the current subject matter.

Referring now to FIG. 7, a diagram of a plan fragment after the first traversal and after a post-order rank has been introduced is depicted, in accordance with one or more embodiments of the current subject matter. The diagram of FIG. 7 is intended to be a continuation of the discussion of FIG. 6. After the first traversal of a plan fragment has been performed, a post-order rank is introduced to add pipeline indexing. As shown at the bottom of the plan fragment, the TableScan as the leaf operator are initialized as pipeline 1. And with the shared subplan (SSP), this does not change, and the pipeline is still pipeline 1. Then, with the references, these have been marked as pipeline breakers during the first traversal, and so new pipelines are introduced, with pipeline 2 introduced for the build side and pipeline 3 introduced for the probe side. After the HashJoin, the build side ceases and is no longer active, but pipeline 3 still remains active, so the next operator would still be in pipeline 3.

Figure 8:
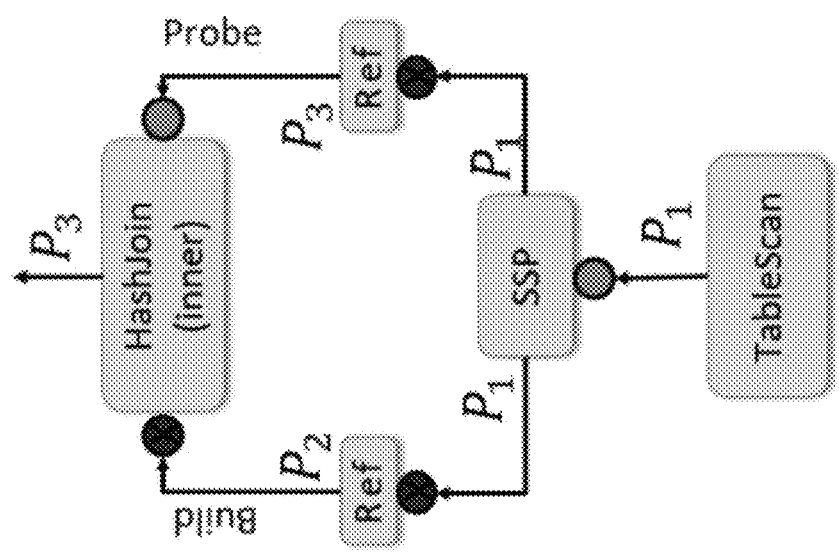
FIG. 8 illustrates a diagram of the pipeline dependencies for a given plan fragment, in accordance with some example implementations of the current subject matter.
Figure 8:
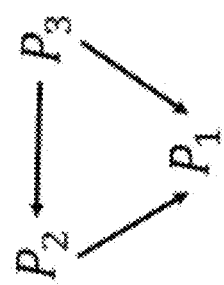

Turning now to FIG. 8, a diagram of the pipeline dependencies for a given plan fragment is shown, in accordance with one or more embodiments of the current subject matter. The diagram of FIG. 8 is intended to be a continuation of the discussion of FIG. 7. As shown on the bottom left-side of FIG. 8, a dependency exists from pipeline 2 to pipeline 1, since pipeline 1 needs to be executed first before pipeline 2 is started. Also, a dependency exists from pipeline 3 to pipeline 1. Additionally, a dependency exists from pipeline 3 to pipeline 2. Generally speaking, for any relation, the relation's right-most children depend on the relation's left-most children that are pipeline breakers. In this example, for the HashJoin relation, the output can only be posted when the result on the left-side is ready. So, the HashJoin relation defines a dependency from its right-child (i.e., pipeline 3) to its left-child (i.e., pipeline 2).

Figure 9:
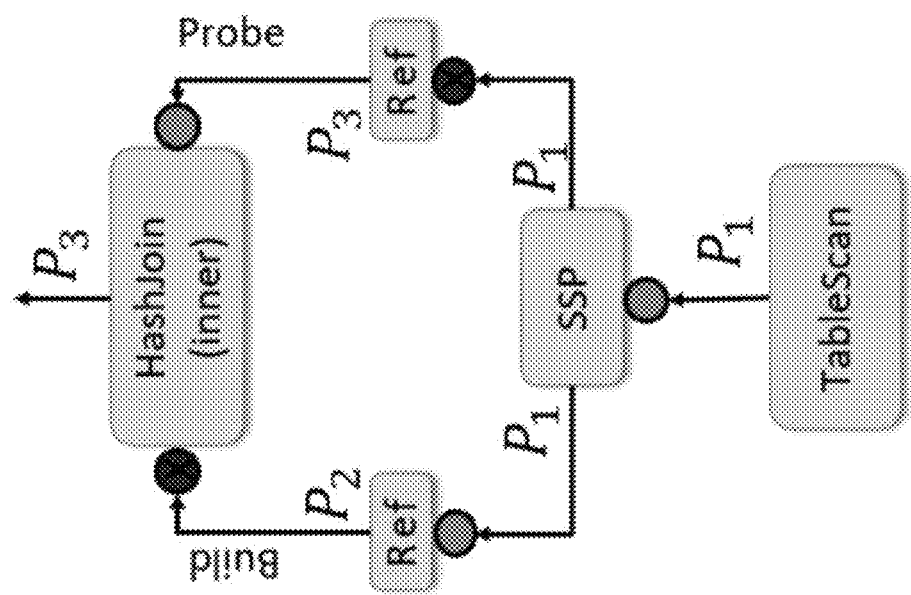
FIG. 9 illustrates a diagram of a given plan fragment after a second traversal, in accordance with some example implementations of the current subject matter.
Figure 9:
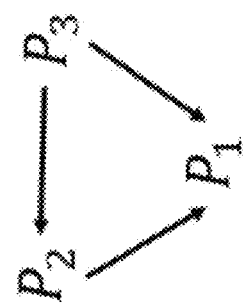

Referring now to FIG. 9, a diagram of a given plan fragment after a second traversal is shown, in accordance with one or more embodiments of the current subject matter. The diagram of FIG. 9 is intended to be a continuation of the discussion of FIG. 8. The plan fragment in FIG. 9 illustrates the assignment of pipeline breakers and non-pipeline breakers after all of the shared subplan references have been reevaluated. In this case, pipeline 2 and pipeline 3 are analyzed, and a determination is made as to where each pipeline starts. For both pipeline 2 and pipeline 3, this would be the associated shared subplan (SSP), which would be pipeline 1. Then, it is determined whether pipeline 2 has a dependency to a pipeline that is larger than the shared subplan pipeline (pipeline 1). In this case, pipeline 2 does not have any dependencies larger than pipeline 1, and therefore a pipeline breaker does not have to be introduced for pipeline 2. This means that pipeline 2 is a shared subplan pipelining reference (i.e., a non-pipeline breaker).

On the other hand, the reference on the right-side (i.e., pipeline 3) has a dependency to a pipeline index (i.e., pipeline 2) that comes after pipeline 1. Accordingly, since the index of pipeline 2 is bigger than the index of pipeline 1, a pipeline breaker is introduced at the shared subplan reference on the right-side (i.e., the probe side). Generally speaking, a reference must break (i.e., a pipeline breaker is introduced) if the associated pipeline $P_i$ is dependent on a pipeline $P_j$ that is created after the pipeline $P_s$ from which the pipeline $P_i$ originated. It can be determined that the pipeline $P_j$ is created after the pipeline $P_s$ if s<j.

Figure 10:
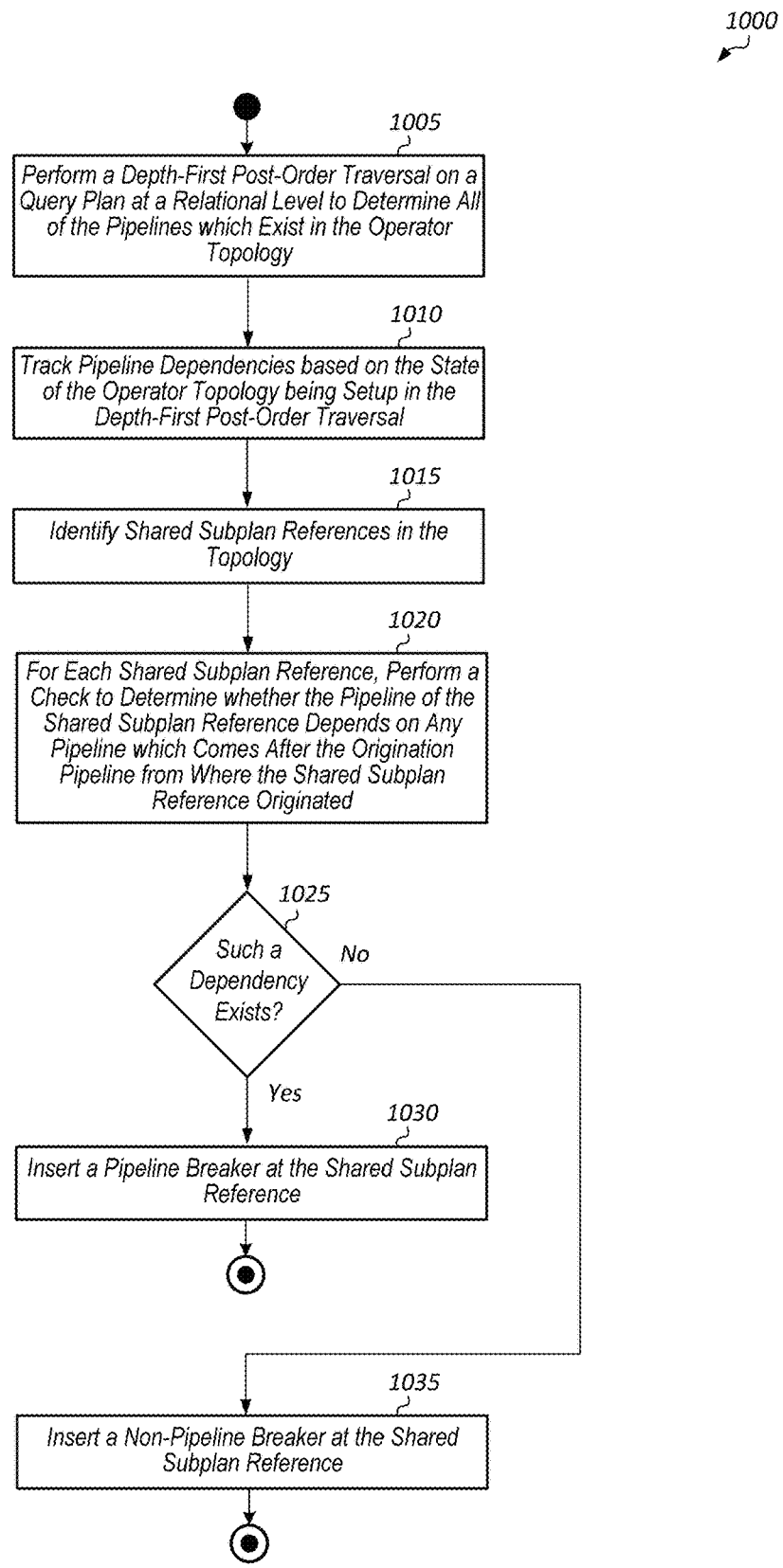
FIG. 10 illustrates an example of a process for determining whether a shared subplan reference should be qualified as a pipeline breaker or a non-pipeline breaker, in accordance with some example implementations of the current subject matter.

Turning now to FIG. 10, a process for determining whether a shared subplan reference should be qualified as a pipeline breaker or a non-pipeline breaker is depicted, in accordance with one or more embodiments of the current subject matter. A depth-first post-order traversal is performed on a query plan at a relational level to determine all of the pipelines which exist in the operator topology (block 1005). When a pipeline breaker is inserted into the query plan, a new pipeline is created which is executed next. This is what is tracked during the depth-first post-order traversal on a relational level. In other words, during the depth-first post-order traversal, the topology of the operators in the plan is determined on the level of relational algebra.

Also, pipeline dependencies are tracked based on the state of the operator topology being setup in the depth-first post-order traversal (block 1010). Additionally, shared subplan references are identified in the topology (block 1015). For each shared subplan reference, a check is performed to determine whether the pipeline of the shared subplan reference depends on any pipeline which comes after the origination pipeline from where the shared subplan reference originated (block 1020). If the pipeline of the shared subplan reference depends on any pipeline which comes after the shared subplan reference's origination pipeline (conditional block 1025, "yes" leg), then a pipeline breaker is inserted at the shared subplan reference (block 1030). Otherwise, if the pipeline of the shared subplan reference has no dependencies on pipelines which come after the shared subplan reference's origination pipeline (conditional block 1025, "no" leg), then a non-pipeline breaker is inserted at the shared subplan reference (i.e., the shared subplan reference can be pipelined) (block 1035). After blocks 1030 and 1035, method 1000 may end.

Figure 11:
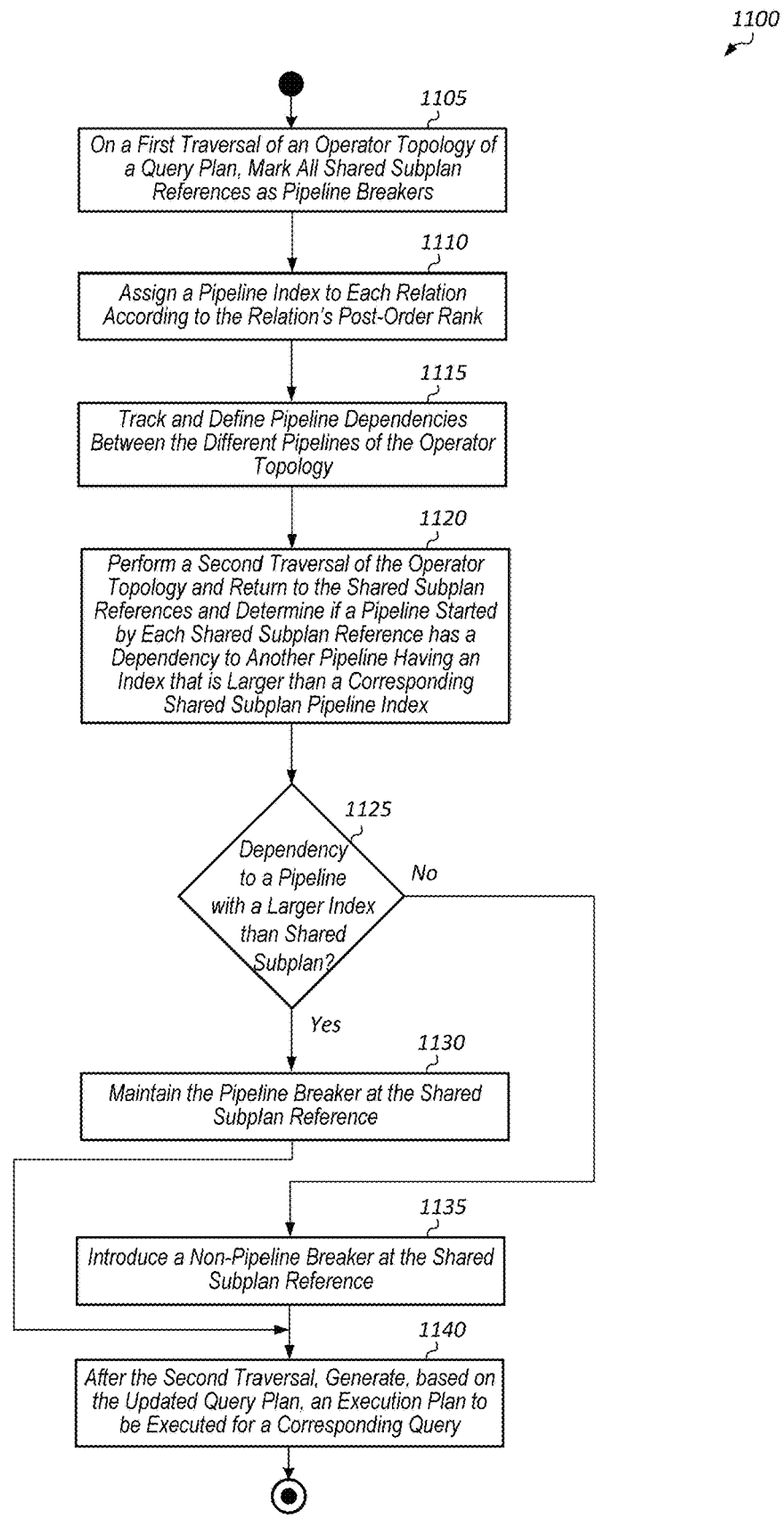
FIG. 11 illustrates an example of a process for employing shared subplan pipelining inference techniques, in accordance with some example implementations of the current subject matter.

Referring now to FIG. 11, a process for employing shared subplan pipelining inference techniques is depicted, in accordance with one or more embodiments of the current subject matter. On a first traversal of an operator topology of a query plan, all shared subplan references are marked as pipeline breakers (block 1105). Each shared subplan reference refers to a shared subplan from which the shared subplan reference originates. Each shared subplan is associated with a shared node in the operator topology. After marking all shared subplan references as pipeline breakers, a pipeline index is assigned to each relation according to the relation's post-order rank (block 1110). Next, pipeline dependencies are tracked and defined between the different pipelines of the operator topology (block 1115). In other words, dependencies are defined based on which pipelines are waiting on results that are generated by other pipelines. In an example, the probe side of a HashJoin operation is dependent on the build side of the HashJoin operation because the probe side needs to wait for the HashMap to be generated by the build side. In other examples, other operations may have other dependencies which are based on the specific operation being performed.

Then, a second traversal of the operator topology is performed to return to the shared subplan references and determine if a pipeline started by the shared subplan reference has a dependency to another pipeline having an index that is larger than a corresponding shared subplan pipeline index (block 1120). It is noted that performing first and second traversals of the operator topology is merely indicative of one particular embodiment. In other embodiments, a single traversal of the operator topology may be performed, with the single traversal including multiple steps such as a pre-order visit and a post-order visit. The pre-order visit refers to a visit to a given operator in before going to the given operator's children, while the post-order visit refers to a visit to the given operator after returning from the given operator's children. For each shared subplan reference, if the pipeline started by the shared subplan reference has a dependency to another pipeline having an index that is larger than the pipeline index of the corresponding shared subplan (conditional block 1125, "yes" leg), then the pipeline breaker at the shared subplan reference is maintained (block 1130). Otherwise, if the pipeline started by the shared subplan reference does not have a dependency to another pipeline having an index that is larger than the pipeline index of the corresponding shared subplan (conditional block 1125, "no" leg), then a non-pipeline breaker is introduced at the shared subplan reference (block 1135). Following blocks 1130 and 1135, after the second traversal of the operator topology, an execution plan is generated, based on the updated query plan, to be executed for a corresponding query (block 1140). After block 1140, method 1100 may end.

Figure 12:
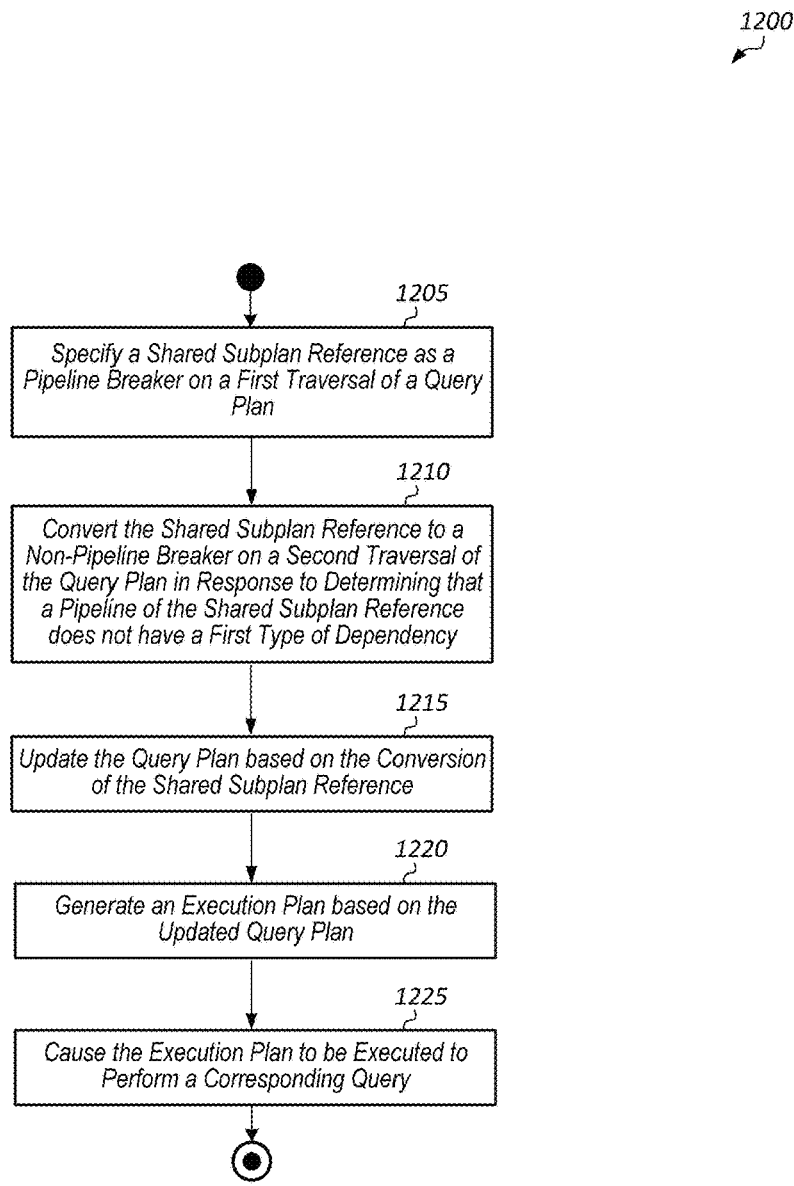
FIG. 12 illustrates an example of a process for updating query plans, in accordance with some example implementations of the current subject matter.

Turning now to FIG. 12, a process for updating query plans is depicted, in accordance with one or more embodiments of the current subject matter. A shared subplan reference is specified as a pipeline breaker on a first traversal of a query plan (block 1205). In an example, all shared subplan references are specified as pipeline breakers during the first traversal of the query plan. Next, the shared subplan reference is converted to a non-pipeline breaker on a second traversal of the query plan in response to determining that a pipeline of the shared subplan reference does not have a first type of dependency (block 1210). In an example, the first type of dependency is defined as a dependency on a pipeline that comes after an origination pipeline from which the shared subplan reference pipeline branches out of. It is noted that in some cases, multiple shared subplan references may be converted to non-pipeline breakers during the second traversal of the query plan. In these cases, multiple instances of block 1210 may be implemented, one for each shared subplan reference that is converted.

Then, the query plan is updated based on the conversion of the shared subplan reference (block 1215). Next, an execution plan is generated based on the updated query plan (block 1220). Then, a database management system causes the execution plan to be executed to perform a corresponding query (block 1225). After block 1225, method 1200 may end.

Figure 13A:
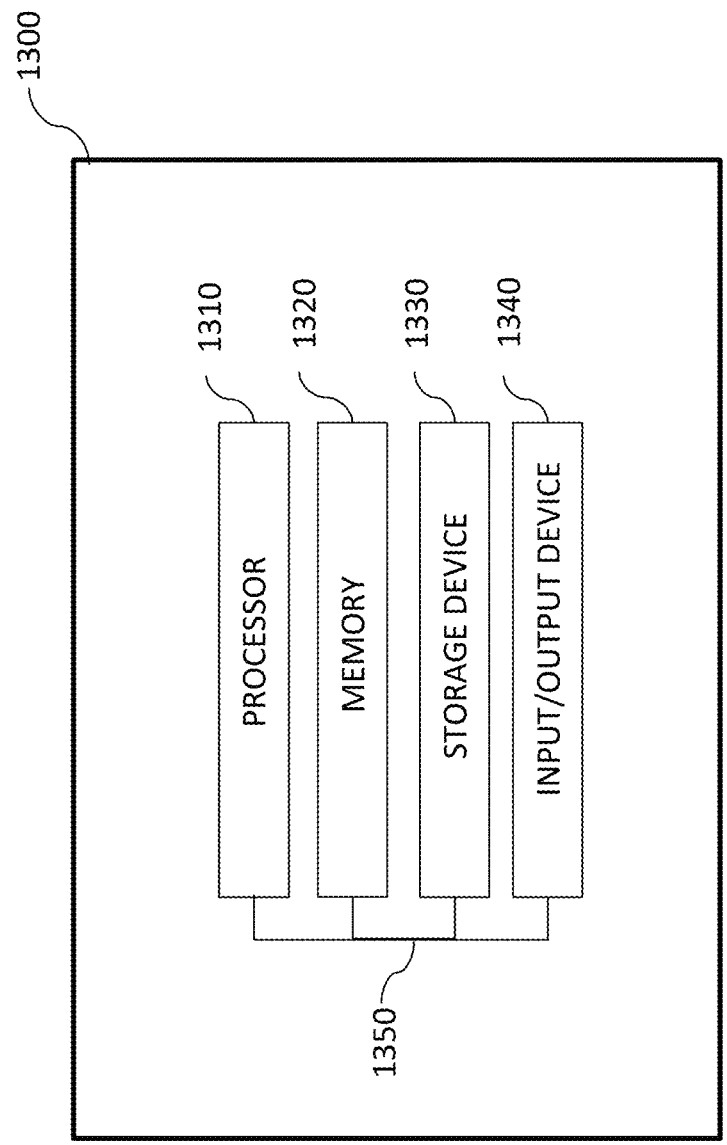
FIG. 13A depicts an example of a system, in accordance with some example implementations of the current subject matter.

In some implementations, the current subject matter may be configured to be implemented in a system 1300, as shown in FIG. 13A. The system 1300 may include a processor 1310, a memory 1320, a storage device 1330, and an input/output device 1340. Each of the components 1310, 1320, 1330 and 1340 may be interconnected using a system bus 1350. The processor 1310 may be configured to process instructions for execution within the system 1300. In some implementations, the processor 1310 may be a single-threaded processor. In alternate implementations, the processor 1310 may be a multi-threaded processor. The processor 1310 may be further configured to process instructions stored in the memory 1320 or on the storage device 1330, including receiving or sending information through the input/output device 1340. The memory 1320 may store information within the system 1300. In some implementations, the memory 1320 may be a computer-readable medium. In alternate implementations, the memory 1320 may be a volatile memory unit. In yet some implementations, the memory 1320 may be a non-volatile memory unit. The storage device 1330 may be capable of providing mass storage for the system 1300. In some implementations, the storage device 1330 may be a computer-readable medium. In alternate implementations, the storage device 1330 may be a floppy disk device, a hard disk device, an optical disk device, a tape device, non-volatile solid state memory, or any other type of storage device. The input/output device 1340 may be configured to provide input/output operations for the system 1300. In some implementations, the input/output device 1340 may include a keyboard and/or pointing device. In alternate implementations, the input/output device 1340 may include a display unit for displaying graphical user interfaces.

Figure 13B:
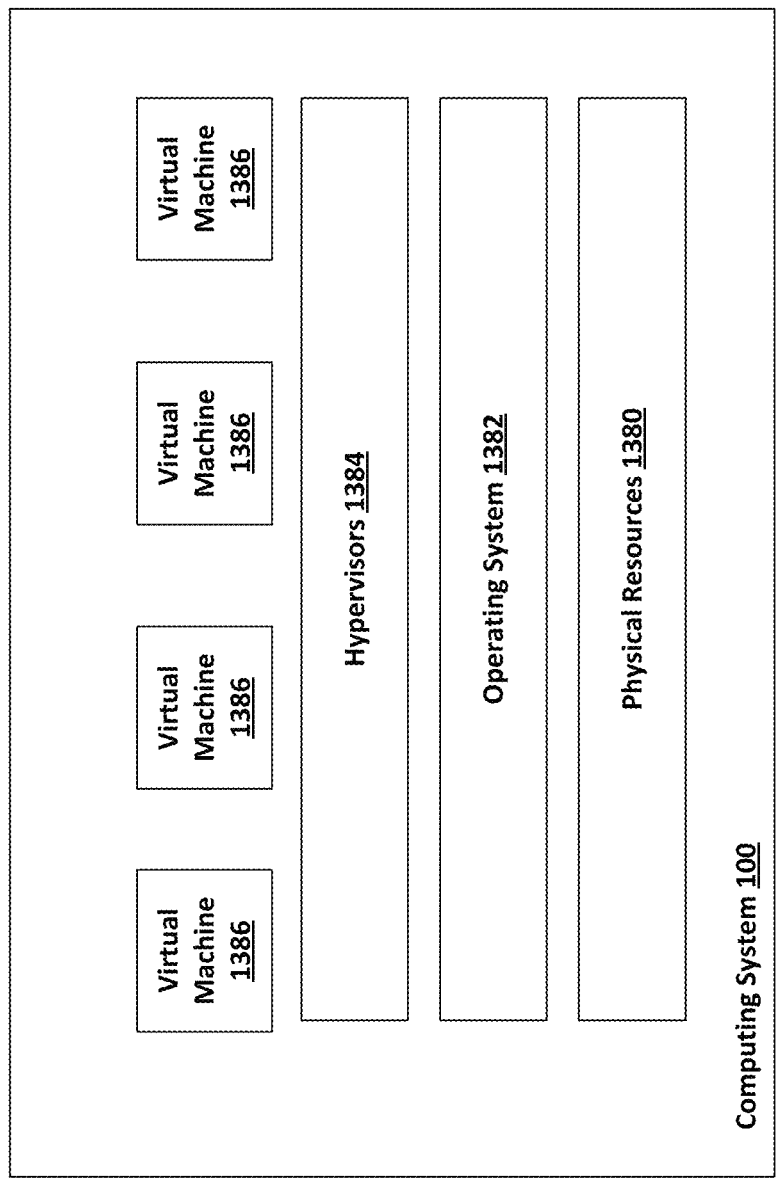
FIG. 13B depicts another example of a system, in accordance with some example implementations of the current subject matter.

FIG. 13B depicts an example implementation of the computing system 100 (of FIG. 1). The computing system 100 may be implemented using various physical resources 1380, such as at least one or more hardware servers, at least one storage, at least one memory, at least one network interface, and the like. The computing system 100 may also be implemented using infrastructure, as noted above, which may include at least one operating system 1382 for the physical resources 1380 and at least one hypervisor 1384 (which may create and run at least one virtual machine 1386). For example, each multitenant application may be run on a corresponding virtual machine 1386.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

Although ordinal numbers such as first, second and the like can, in some situations, relate to an order; as used in a document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include program instructions (i.e., machine instructions) for a programmable processor, and can be implemented in a high-level procedural and/or object-oriented programming language, and/or in assembly/ machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives program instructions as a machine-readable signal. The term "machine-readable signal" refers to any signal used to provide machine instructions and/or data to a programmable processor. The machine-readable medium can store such program instructions non-transitorily, such as for example as would a non-transient solid state memory or a magnetic hard drive or any equivalent storage medium. The machine-readable medium can alternatively or additionally store such machine instructions in a transient manner, such as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

In view of the above-described implementations of subject matter this application discloses the following list of examples, wherein one feature of an example in isolation or more than one feature of said example taken in combination and, optionally, in combination with one or more features of one or more further examples are further examples also falling within the disclosure of this application:

Example 1: A computer-implemented method, comprising: traversing an operator topology of a query plan to identify pipelines within the query plan, wherein the query plan includes a first shared subplan reference, wherein the first shared subplan reference refers to a first shared subplan, and wherein the first shared subplan is associated with a shared node in the operator topology; assigning a pipeline index to each pipeline in the query plan, wherein the pipeline index uniquely identifies each pipeline in the query plan according to a location and an order of execution of the pipeline within the query plan, and wherein a first pipeline of the first shared subplan reference is assigned a first pipeline index; tracking pipeline dependencies of the query plan, wherein pipeline dependencies are tracked using pipeline indices; responsive to determining that the first pipeline has a dependency to a second pipeline with a second pipeline index and responsive to determining that the second pipeline index is greater than a third pipeline index associated with a third pipeline of the first shared subplan, specifying the first shared subplan reference as a pipeline breaker; responsive to determining that the first pipeline does not depend on any pipeline having a pipeline index greater than the third pipeline index, specifying the first shared subplan reference as a non-pipeline breaker; updating the query plan with the first shared subplan reference being specified as either a pipeline breaker or a non-pipeline breaker; and generating, based on the updated query plan, an execution plan for execution of a corresponding query at run time.

Example 2: The computer-implemented method of Example 1, wherein the query plan is structured as a directed acyclic graph.

Example 3: The computer-implemented method of any of Examples 1-2, wherein a pipeline breaker causes execution to stop until one or more conditions are satisfied.

Example 4: The computer-implemented method of any of Examples 1-3, wherein a first condition of the one or more conditions comprises generation of an intermediate result being detected.

Example 5: The computer-implemented method of any of Examples 1-4, wherein the non-pipeline breaker allows execution to continue without waiting for an intermediate result to be generated.

Example 6: The computer-implemented method of any of Examples 1-5, further comprising specifying all shared subplan references as pipeline breakers during a first traversal of the operator topology.

Example 7: The computer-implemented method of any of Examples 1-6, further comprising during the first traversal, creating a new pipeline in the operator topology after a second shared subplan reference.

Example 8: The computer-implemented method of any of Examples 1-7, further comprising checking, during a second traversal of the operator topology, whether the new pipeline depends on any pipeline which comes after an origination pipeline of a second shared subplan corresponding to the second shared subplan reference.

Example 9: The computer-implemented method of any of Examples 1-8, further comprising converting the second shared subplan reference to a non-pipeline breaker responsive to determining, during the second traversal of the operator topology, that the new pipeline does not depend on any pipeline having a pipeline index greater than a given pipeline index of the origination pipeline.

Example 10: The computer-implemented method of any of Examples 1-9, further comprising maintaining the first shared subplan reference as a pipeline breaker responsive to determining, during the second traversal of the operator topology, that the new pipeline has a dependency on a fourth pipeline with a fourth pipeline index greater than the given pipeline index.

Example 11: A system comprising: at least one processor; and at least one memory storing instructions that, when executed by the at least one processor, cause operations comprising: traversing an operator topology of a query plan to identify pipelines within the query plan, wherein the query plan includes a first shared subplan reference, wherein the first shared subplan reference refers to a first shared subplan, and wherein the first shared subplan is associated with a shared node in the operator topology; assigning a pipeline index to each pipeline in the query plan, wherein the pipeline index uniquely identifies each pipeline in the query plan according to a location and an order of execution of the pipeline within the query plan, and wherein a first pipeline of the first shared subplan reference is assigned a first pipeline index; tracking pipeline dependencies of the query plan, wherein pipeline dependencies are tracked using pipeline indices; responsive to determining that the first pipeline has a dependency to a second pipeline with a second pipeline index and responsive to determining that the second pipeline index is greater than a third pipeline index associated with a third pipeline of the first shared subplan, specifying the first shared subplan reference as a pipeline breaker; responsive to determining that the first pipeline does not depend on any pipeline having a pipeline index greater than the third pipeline index, specifying the first shared subplan reference as a non-pipeline breaker; updating the query plan with the first shared subplan reference being specified as either a pipeline breaker or a non-pipeline breaker; and generating, based on the updated query plan, an execution plan for execution of a corresponding query at run time.

Example 12: The system of Example 11, wherein the query plan is structured as a directed acyclic graph.

Example 13: The system of any of Examples 11-12, wherein the operations further comprise wherein a pipeline breaker causes execution to stop until one or more conditions are satisfied.

Example 14: The system of any of Examples 11-13, wherein a first condition of the one or more conditions comprises generation of an intermediate result being detected.

Example 15: The system of any of Examples 11-14, wherein the non-pipeline breaker allows execution to continue without waiting for an intermediate result to be generated.

Example 16: The system of any of Examples 11-15, wherein the operations further comprise specifying all shared subplan references as pipeline breakers during a first traversal of the operator topology.

Example 17: The system of any of Examples 11-16, wherein the operations further comprise creating, during the first traversal, a new pipeline in the operator topology after a second shared subplan reference.

Example 18: The system of any of Examples 11-17, wherein the operations further comprise checking, during a second traversal of the operator topology, whether the new pipeline depends on any pipeline which comes after an origination pipeline of a second shared subplan corresponding to the second shared subplan reference.

Example 19: The system of any of Examples 11-18, wherein the operations further comprise converting the second shared subplan reference to a non-pipeline breaker responsive to determining, during the second traversal of the operator topology, that the new pipeline does not depend on any pipeline having a pipeline index greater than a given pipeline index of the origination pipeline.

Example 20: A non-transitory computer readable medium storing instructions, which when executed by at least one data processor, result in operations comprising: traversing an operator topology of a query plan to identify pipelines within the query plan, wherein the query plan includes a first shared subplan reference, wherein the first shared subplan reference refers to a first shared subplan, and wherein the first shared subplan is associated with a shared node in the operator topology; assigning a pipeline index to each pipeline in the query plan, wherein the pipeline index uniquely identifies each pipeline in the query plan according to a location and an order of execution of the pipeline within the query plan, and wherein a first pipeline of the first shared subplan reference is assigned a first pipeline index; tracking pipeline dependencies of the query plan, wherein pipeline dependencies are tracked using pipeline indices; responsive to determining that the first pipeline has a dependency to a second pipeline with a second pipeline index and responsive to determining that the second pipeline index is greater than a third pipeline index associated with a third pipeline of the first shared subplan, specifying the first shared subplan reference as a pipeline breaker; responsive to determining that the first pipeline does not depend on any pipeline having a pipeline index greater than the third pipeline index, specifying the first shared subplan reference as a non-pipeline breaker; updating the query plan with the first shared subplan reference being specified as either a pipeline breaker or a non-pipeline breaker; and generating, based on the updated query plan, an execution plan for execution of a corresponding query at run time.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed:

1. A computer-implemented method comprising:
   traversing an operator topology of a query plan to identify pipelines within the query plan, wherein the query plan includes a first shared subplan reference, wherein the first shared subplan reference refers to a first shared subplan, and wherein the first shared subplan is associated with a shared node in the operator topology;
   assigning a pipeline index to each pipeline in the query plan, wherein the pipeline index uniquely identifies each pipeline in the query plan according to a location and an order of execution of the pipeline within the query plan, and wherein a first pipeline of the first shared subplan reference is assigned a first pipeline index;
   tracking pipeline dependencies of the query plan, wherein pipeline dependencies are tracked using pipeline indices;
   responsive to determining that the first pipeline has a dependency to a second pipeline with a second pipeline index and responsive to determining that the second pipeline index is greater than a third pipeline index associated with a third pipeline of the first shared subplan, specifying the first shared subplan reference as a pipeline breaker;
   responsive to determining that the first pipeline does not depend on any pipeline having a pipeline index greater than the third pipeline index, specifying the first shared subplan reference as a non-pipeline breaker;
   updating the query plan with the first shared subplan reference being specified as either a pipeline breaker or a non-pipeline breaker; and
   generating, based on the updated query plan, an execution plan for execution of a corresponding query at run time.

2. The computer-implemented method of claim 1, wherein the query plan is structured as a directed acyclic graph.

3. The computer-implemented method of claim 1, wherein a pipeline breaker causes execution to stop until one or more conditions are satisfied.

4. The computer-implemented method of claim 3, wherein a first condition of the one or more conditions comprises generation of an intermediate result being detected.

5. The computer-implemented method of claim 1, wherein the non-pipeline breaker allows execution to continue without waiting for an intermediate result to be generated.

6. The computer-implemented method of claim 1, further comprising specifying all shared subplan references as pipeline breakers during a first traversal of the operator topology.

7. The computer-implemented method of claim 6, further comprising during the first traversal, creating a new pipeline in the operator topology after a second shared subplan reference.

8. The computer-implemented method of claim 7, further comprising checking, during a second traversal of the operator topology, whether the new pipeline depends on any pipeline which comes after an origination pipeline of a second shared subplan corresponding to the second shared subplan reference.

9. The computer-implemented method of claim 8, further comprising converting the second shared subplan reference to a non-pipeline breaker responsive to determining, during the second traversal of the operator topology, that the new pipeline does not depend on any pipeline having a pipeline index greater than a given pipeline index of the origination pipeline.

10. The computer-implemented method of claim 9, further comprising maintaining the first shared subplan reference as a pipeline breaker responsive to determining, during the second traversal of the operator topology, that the new pipeline has a dependency on a fourth pipeline with a fourth pipeline index greater than the given pipeline index.

11. A system comprising:
    at least one processor; and
    at least one memory storing instructions that, when executed by the at least one processor, cause operations comprising:
      traversing an operator topology of a query plan to identify pipelines within the query plan, wherein the query plan includes a first shared subplan reference, wherein the first shared subplan reference refers to a first shared subplan, and wherein the first shared subplan is associated with a shared node in the operator topology;
      assigning a pipeline index to each pipeline in the query plan, wherein the pipeline index uniquely identifies each pipeline in the query plan according to a location and an order of execution of the pipeline within the query plan, and wherein a first pipeline of the first shared subplan reference is assigned a first pipeline index;
      tracking pipeline dependencies of the query plan, wherein pipeline dependencies are tracked using pipeline indices;
      responsive to determining that the first pipeline has a dependency to a second pipeline with a second pipeline index and responsive to determining that the second pipeline index is greater than a third pipeline index associated with a third pipeline of the first shared subplan, specifying the first shared subplan reference as a pipeline breaker;
      responsive to determining that the first pipeline does not depend on any pipeline having a pipeline index greater than the third pipeline index, specifying the first shared subplan reference as a non-pipeline breaker;
      updating the query plan with the first shared subplan reference being specified as either a pipeline breaker or a non-pipeline breaker; and
      generating, based on the updated query plan, an execution plan for execution of a corresponding query at run time.

12. The system of claim 11, wherein the query plan is structured as a directed acyclic graph.

13. The system of claim 11, wherein the operations further comprise wherein a pipeline breaker causes execution to stop until one or more conditions are satisfied.

14. The system of claim 13, wherein a first condition of the one or more conditions comprises generation of an intermediate result being detected.

15. The system of claim 11, wherein the non-pipeline breaker allows execution to continue without waiting for an intermediate result to be generated.

16. The system of claim 11, wherein the operations further comprise specifying all shared subplan references as pipeline breakers during a first traversal of the operator topology.

17. The system of claim 16, wherein the operations further comprise creating, during the first traversal, a new pipeline in the operator topology after a second shared subplan reference.

18. The system of claim 17, wherein the operations further comprise checking, during a second traversal of the operator topology, whether the new pipeline depends on any pipeline which comes after an origination pipeline of a second shared subplan corresponding to the second shared subplan reference.

19. The system of claim 18, wherein the operations further comprise converting the second shared subplan reference to a non-pipeline breaker responsive to determining, during the second traversal of the operator topology, that the new pipeline does not depend on any pipeline having a pipeline index greater than a given pipeline index of the origination pipeline.

20. A non-transitory computer readable medium storing instructions, which when executed by at least one data processor, result in operations comprising:
- traversing an operator topology of a query plan to identify pipelines within the query plan, wherein the query plan includes a first shared subplan reference, wherein the first shared subplan reference refers to a first shared subplan, and wherein the first shared subplan is associated with a shared node in the operator topology;
- assigning a pipeline index to each pipeline in the query plan, wherein the pipeline index uniquely identifies each pipeline in the query plan according to a location and an order of execution of the pipeline within the query plan, and wherein a first pipeline of the first shared subplan reference is assigned a first pipeline index;
- tracking pipeline dependencies of the query plan, wherein pipeline dependencies are tracked using pipeline indices;
- responsive to determining that the first pipeline has a dependency to a second pipeline with a second pipeline index and responsive to determining that the second pipeline index is greater than a third pipeline index associated with a third pipeline of the first shared subplan, specifying the first shared subplan reference as a pipeline breaker responsive to determining that the first pipeline has a dependency to a second pipeline with a second pipeline index, and responsive to determining that the second pipeline index is greater than a third pipeline index associated with a third pipeline of the first shared subplan;
- responsive to determining that the first pipeline does not depend on any pipeline having a pipeline index greater than the third pipeline index, specifying the first shared subplan reference as a non-pipeline breaker;
- updating the query plan with the first shared subplan reference being specified as either a pipeline breaker or a non-pipeline breaker; and
- generating, based on the updated query plan, an execution plan for execution of a corresponding query at run time.

* * * * *